US010189518B2

(12) United States Patent
Dumitru et al.

(10) Patent No.: US 10,189,518 B2
(45) Date of Patent: Jan. 29, 2019

(54) TRACK NUT WITH INCREASED BEARING AREA

(71) Applicant: Caterpillar Inc., Peoria, IL (US)

(72) Inventors: Mircea Dumitru, Washington, IL (US); Jeffrey Paul Nash, Peoria, IL (US)

(73) Assignee: Caterpillar Inc., Deerfield, IL (US)

( * ) Notice: Subject to any disclaimer, the term of this patent is extended or adjusted under 35 U.S.C. 154(b) by 122 days.

(21) Appl. No.: 15/295,826

(22) Filed: Oct. 17, 2016

(65) Prior Publication Data

US 2018/0105216 A1    Apr. 19, 2018

(51) Int. Cl.
| | |
|---|---|
| *B62D 55/28* | (2006.01) |
| *B62D 55/21* | (2006.01) |
| *F16B 37/00* | (2006.01) |
| *B62D 55/06* | (2006.01) |

(52) U.S. Cl.
CPC ............ *B62D 55/28* (2013.01); *B62D 55/21* (2013.01); *F16B 37/00* (2013.01); *B62D 55/06* (2013.01)

(58) Field of Classification Search
CPC .......... B62D 55/28; B62D 55/06; F16B 37/00
USPC ........... 305/174, 181, 185, 187, 19; 411/427
See application file for complete search history.

(56) References Cited

U.S. PATENT DOCUMENTS

| | | | |
|---|---|---|---|
| 1,588,549 A | 6/1926 | Harkness | |
| 3,219,790 A * | 11/1965 | Johnson | B23K 11/14 219/93 |
| 3,441,073 A * | 4/1969 | Johnson | F16B 39/284 411/284 |
| 3,726,570 A * | 4/1973 | Wetherill | B62D 55/28 305/187 |
| 5,299,860 A | 4/1994 | Anderson | |
| 5,842,756 A | 12/1998 | Spencer | |
| 5,921,642 A | 7/1999 | Kelly | |
| 2004/0109626 A1 | 6/2004 | Caterpillar | |
| 2004/0247409 A1* | 12/2004 | Chiang | F16B 31/02 411/9 |
| 2014/0208575 A1 | 7/2014 | Caterpillar | |
| 2015/0285291 A1* | 10/2015 | Kopp | F16B 35/00 411/378 |
| 2016/0221619 A1 | 8/2016 | Komatsu | |

FOREIGN PATENT DOCUMENTS

| | | |
|---|---|---|
| GB | 1272818 A | 5/1972 |
| JP | s58101879 | 6/1983 |

OTHER PUBLICATIONS

U.S. Appl. No. 29/581,185, filed Oct. 17, 2016. (Unpublished).

* cited by examiner

*Primary Examiner* — S. Joseph Morano
*Assistant Examiner* — Jean W Charleston
(74) *Attorney, Agent, or Firm* — Law Office of Kurt J. Fugman LLC (57) ABSTRACT

A track nut comprises a main body defining a central aperture with threads disposed in the central aperture, the aperture defining a cylindrical axis and a radial direction, a first end and a second end disposed along the cylindrical axis, and wherein the first end defines an at least partially circular perimeter and the second end defines a generally polygonal perimeter with a plurality of corners, the polygonal perimeter including at least one variable blend portion.

6 Claims, 11 Drawing Sheets

TRACK NUT WITH INCREASED BEARING AREA

TECHNICAL FIELD

The present disclosure relates to track nut that is used as a part of a track chain assembly attached to the undercarriage of track-type vehicles used for off-road operations such as those that use endless tracks for moving on the ground. Specifically, the present disclosure relates to a track nut used to attach a track shoe to a track link in such a manner that the connection does not become loose over time.

BACKGROUND

In many current applications, track shoes are attached to track links, which are part of the track chain, used on the endless track drives of machines in the construction, earth moving, and mining industries, etc. These track shoes are often attached to the track links using a bolted connection. More specifically, the track shoe is attached to the underside of the track link using a bolt that extends through aligned apertures of the track link and the track shoes where the free end of the bolt mates with a track nut that contacts a pocket formed in the track link. As a user torques the head of the bolt until it contacts the track shoe, the track nut is held in place by the pocket of the track link, preventing rotation of the track nut. As a result, the bolt is drawn upward toward the track nut, compressing a portion of the track link and the track shoe until a reliable bolted connection is achieved.

In some applications, a loosening of the bolted connection of the track shoe to the track link occurs over time. This may lead to the track shoe falling off the track link or other operational and maintenance issues that may lead to lost time and unwanted costs.

U.S. Pat. No. 3,726,570 to Wetherill et al. discloses a track nut with specialized geometry. More specifically, the track nut has one end that is substantially circularly shaped and another end that is square shaped. This geometry fool proofs the assembly of the nut into pocket of the track link so that if the nut is reversed such that the circular portion is in the pocket, the nut will rotate with the bolt, preventing tightening of the bolted joint (see FIG. 3 of Wetherill et al). However, if the nut is properly installed in the pocket of the track link, the nut is held in place, allowing tightening of the bolted joint (see FIGS. 1 and 2 of Wetherill et al). This construction helps to ensure that when the nut is properly installed, enough bearing area is provided between the nut and the pocket of the track link so that the bolted connection is not as susceptible to loosening over time (see FIG. 4 of Wetherill et al).

However, it is has been discovered that such loosening may still occur over time and there is no solution currently offered in the field of track chains to prevent the loosening of the bolted connection. Accordingly, a method and associated apparatus is needed to prevent this unwanted loosening of the bolted connection.

SUMMARY

A track nut is provided comprising a main body defining a central aperture with threads disposed in the central aperture, the aperture defining a cylindrical axis and a radial direction, a first end and a second end disposed along the cylindrical axis, and wherein the second end defines a generally polygonal perimeter with a plurality of corners, the polygonal perimeter including at least one variable blend portion that defines a radius of curvature that decreases between the plurality of corners.

A track nut is provided comprising a main body defining a central aperture with threads disposed in the central aperture, the aperture defining a cylindrical axis and a radial direction, a first end and a second end disposed along the cylindrical axis, and wherein the first end defines an at least partially circular perimeter and the second end defines a generally polygonal perimeter with a plurality of corners, the polygonal perimeter including at least one variable blend portion.

A track chain is provided comprising a plurality of track pins and track bushings disposed about the track pins, and a plurality of track links that are connected to each other by either a track pin or a track bushing, wherein at least one track link comprises defines a plurality of apertures for receiving a track pin or bushing, a plurality of track bolts, a plurality of track shoes attached to the track link, and a plurality of track nuts, each track nut including a main body defining a central aperture with threads disposed in the central aperture, the aperture defining a cylindrical axis and a radial direction, a first end and a second end disposed along the cylindrical axis, and wherein the second end defines a generally polygonal perimeter with a plurality of corners, the polygonal perimeter including at least one variable blend portion.

BRIEF DESCRIPTION OF THE DRAWINGS

The accompanying drawings, which are incorporated in and constitute a part of this specification, illustrate several embodiments of the disclosure and together with the description, serve to explain the principles of the disclosure. In the drawings.

DETAILED DESCRIPTION

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100a, 100b etc. It is to be understood that the use of letters immediately after a reference number indicates that these features are similarly shaped and have similar function as is often the case when geometry is mirrored about a plane of symmetry. For ease of explanation in this specification, letters will often not be included herein but may be shown in the drawings to indicate duplications of features discussed within this written specification.

The inventors of the present disclosure have determined that the loosening of the bolted connection between the shoes and the track links occurs when not enough clamp load is applied and retained on the bolted joint during operation. Lab tests have shown that an increased surface area for track nut will significantly improve clamp load retention during loading cycles. Of course, this could be achieved by increased the size of the bolted connection by using a larger bolt and/or nut but this may not be feasible in all applications.

Various embodiments of the present disclosure include a track nut that has a reduced blend joining its bearing face to the side faces or flats of the nut. In many embodiments of the present disclosure, this involves using a variable blend somewhere on the track nut to increase the bear surface. In certain embodiments, the variable blend may be located between the corners of the track nut. In other embodiments, the variable blend may be located at the corner of the track nut. The blend may define a radius that is greater than or equal to the corresponding radius of the pocket in which the track nut is intended to sit. The radius may be varied such that the pocket radius may stay large enough to prevent track link cracking. At the same time, the radius of the blend of the track nut may be decreased to increase the bearing face of the track nut at appropriate locations.

Figure 1:
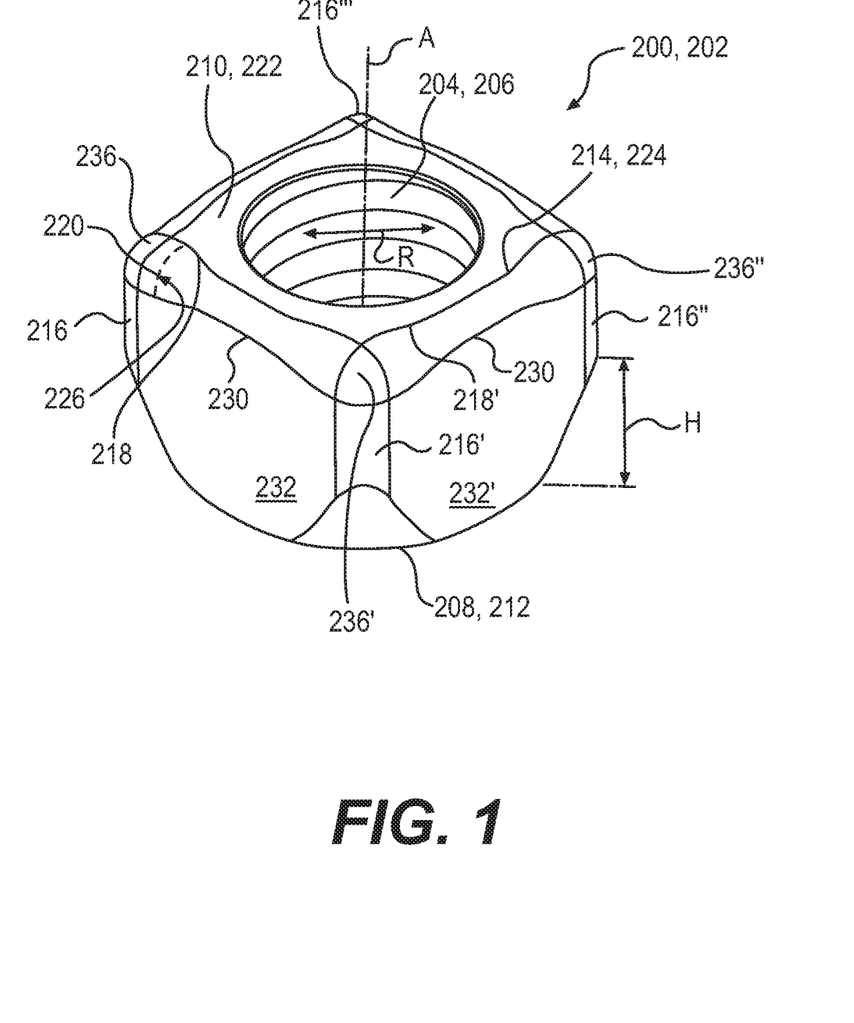
FIG. 1 is a track nut according to a first embodiment of the present disclosure with an increased bearing area.
Figure 2:
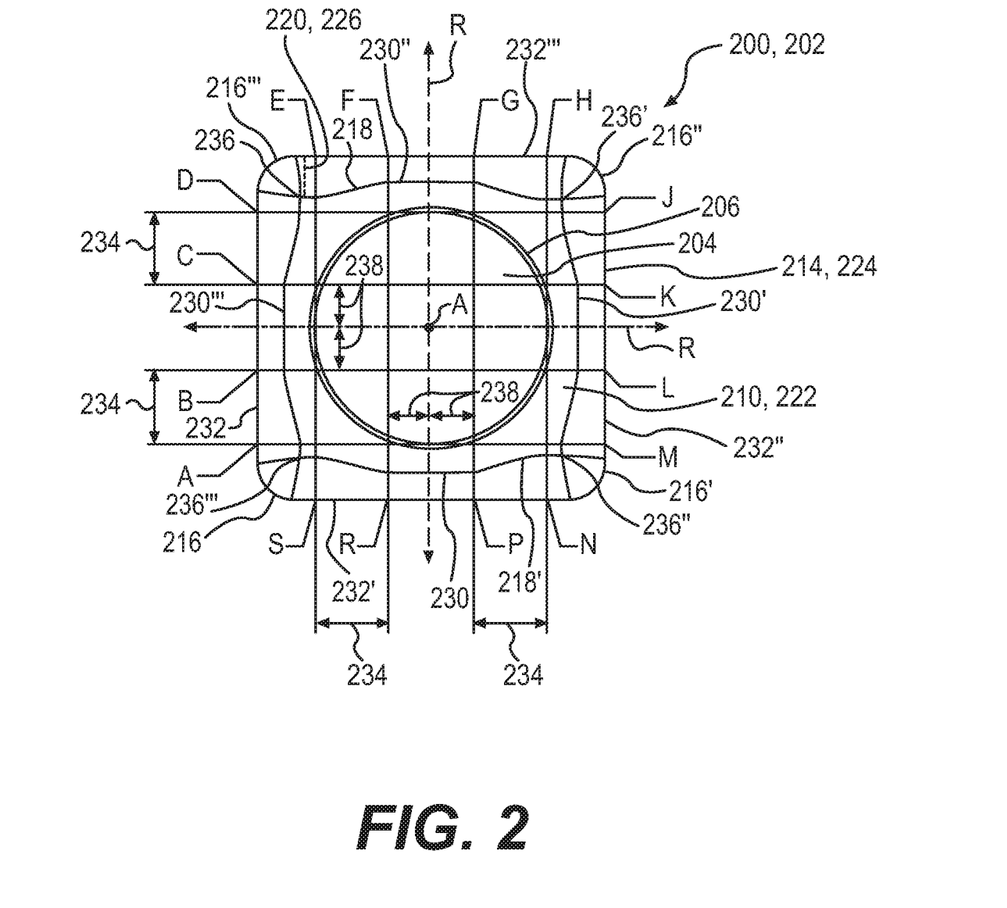
FIG. 2 is a top view of the track nut of FIG. 1 illustrating a variable blend that is provided about the perimeter of the nut, increasing the bearing area of the nut.
Figure 3:
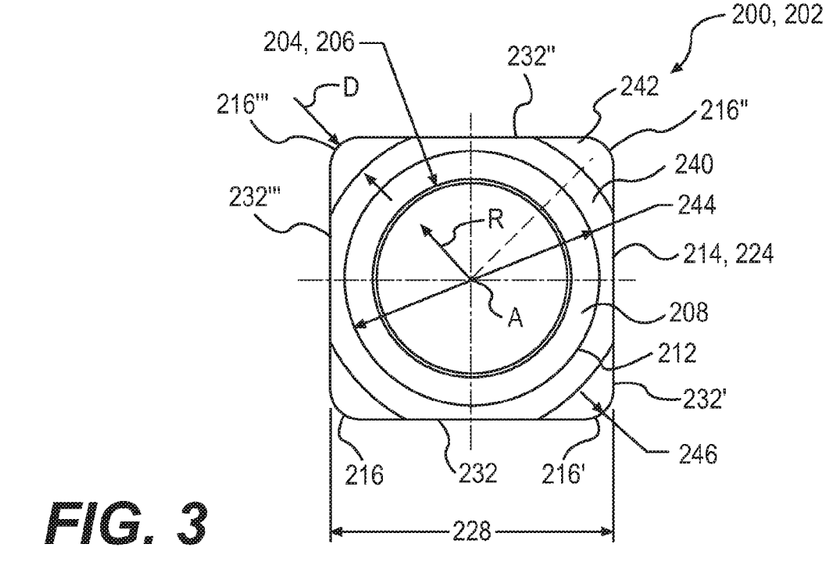
FIG. 3 is a bottom view of the track nut of FIG. 1.

FIGS. 1 thru 3 illustrate an embodiment of a track nut according to an embodiment of the present disclosure. It is to be understood that the track nut may be used with any configuration of a track link for any embodiment discussed herein. Any embodiment of a track link and track nut described herein may be used as part of a track chain assembly of a vehicle that includes a plurality of track pins and bushings. This will be described in further detail later herein.

Looking at FIGS. 1 thru 3, the track nut 200 comprises a main body 202 defining a central aperture 204 with threads 206 disposed in the central aperture 204. The aperture 204 has a cylindrical configuration defining a cylindrical axis A and a radial direction R. The body 202 includes a first end 208 and a second end 210 disposed along the cylindrical axis A. The first end 208 defines an at least partially circular perimeter 212 and the second end 210 defines a generally polygonal perimeter 214 with a plurality of corners 216. Also, the polygonal perimeter 214 includes at least one variable blend portion 218 that defines a radius of curvature 220 that decreases between the corners 216. The second end 210 has a bearing face 222 and is designed to mate with the pocket of the track link while the first end 210 is designed to spin if improperly placed into the pocket, helping to fool proof assembly for reasons discussed above in the "Background" section of the present disclosure.

For the specific embodiment shown in FIGS. 1 thru 3, the polygonal perimeter 214 is a square perimeter 224 that defines four corners 216 and includes a variable blend portion 218 between each of the corners 216 that defines a radius of curvature 220 that decreases between each of the corners 216. As shown, the variable blend portion 218 includes an exact radius 226. However, other blend geometry may be used such as other arcuate shapes including splines and straight shapes such as chamfers, etc.

As best seen in FIG. 2 where the second end 210 of the track nut 200 is clearly shown, the radius of curvature 220 of the variable blend portion 218 varies from 2 to 5 mm. More specifically, the radius of curvature 220 may vary from 2.5 mm at points B, C, F, G, K, L, P and R to 4 mm at points A, D, E, H, J, M, N and S. The flat 232 to flat 232 distance 228 (see FIG. 3 for this dimension) may be approximately 33 mm and all four sides may be identically configured (referring again to FIG. 2) with the minimum radius portion 230 extending a distance 238 of 4 mm from either side of the midpoint of the flat 232 and the variable blend portion 218 being disposed from the end point of the minimum radius region 230 along a distance 234 of 7 mm until the maximum radius portion 236 of 4 mm is reached. The internal threads 206 of the central aperture are M22 X 1.5-6 H for this embodiment but the various dimensions, type of threads and size of the track nut may be varied as needed or desired in other embodiments.

As best seen in FIG. 3 where the first end 208 of the track nut 200 is clearly shown, the corners 216 are removed by revolving or cutting about the cylindrical axis A using a radius 240 and a chamfer 242. Consequently, a circle 244 is defined that is concentric with the central aperture 204. The circle 244 may have a diameter of 28-32 mm.

Looking at FIGS. 1 and 3 together, each corner 216 defines a radius 246 extending along a direction parallel to the cylindrical axis A. This radius 246 may have a value of 2-5 mm. As already mentioned, the body 202 defines a chamfer 242 between the corner 216 and the circular perimeter 212 of the first end 208 of the track nut 200, created by revolving and cutting away that area. The chamfer 242 may define a depth D in the radial direction R of 4 mm while the height H of the chamfer 242 measured along a direction parallel with the cylindrical axis A, which may be 12 mm.

Figure 4:
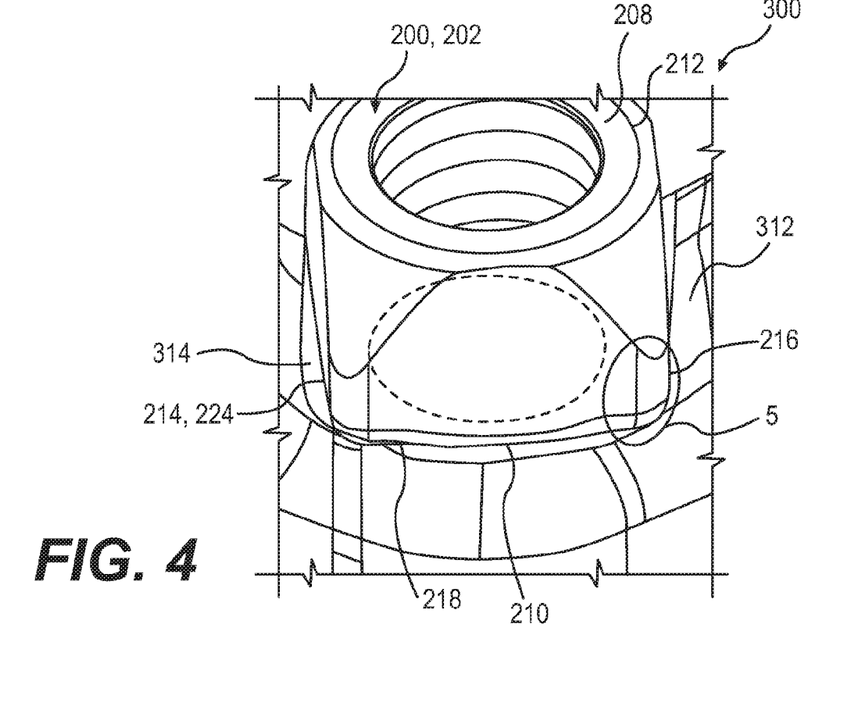
FIG. 4 is a perspective view of the track nut of FIG. 2 seated in a pocket of a track link, illustrating an increased bearing area without creating too much interference between a corner of the nut and a corner of the pocket during installation of the nut.
Figure 5:
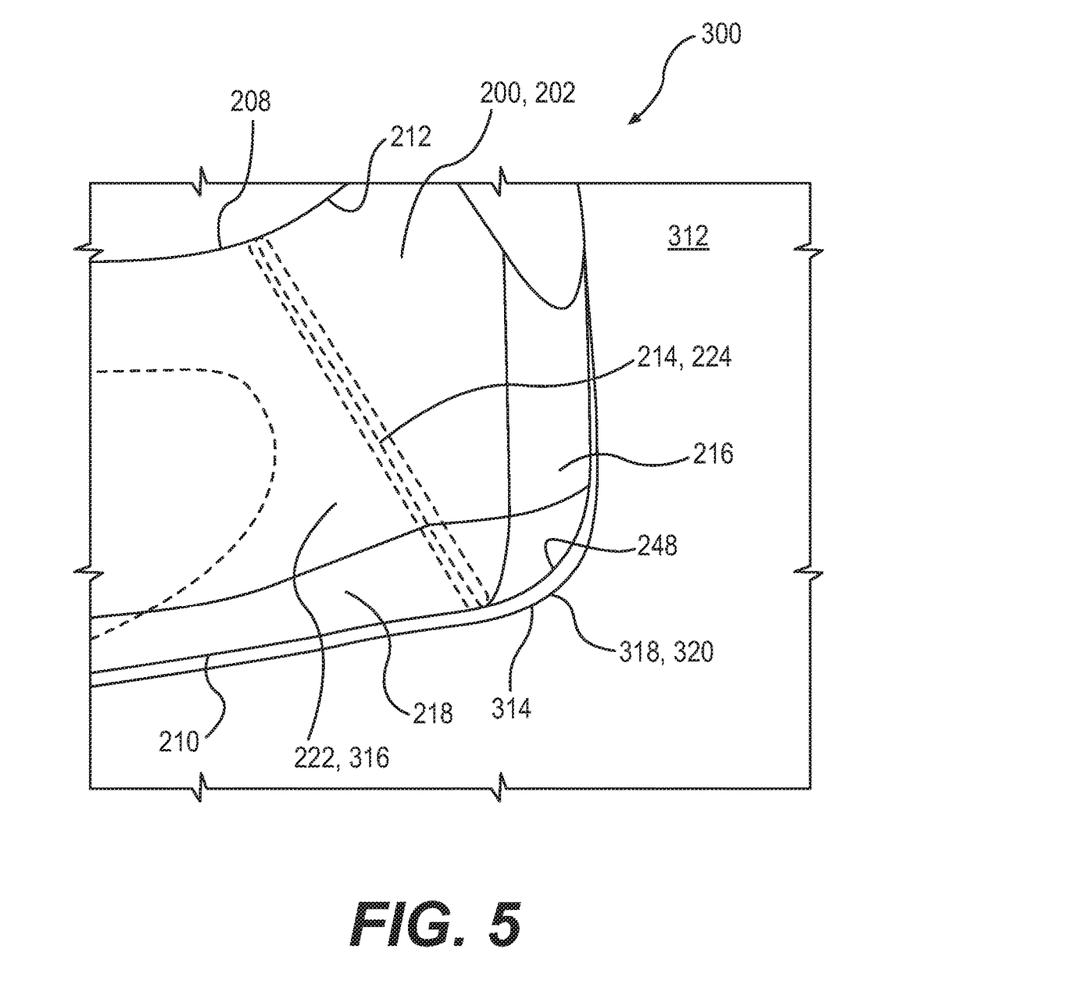
FIG. 5 is an enlarged detail view of the track nut and track link of FIG. 4.
Figure 11:
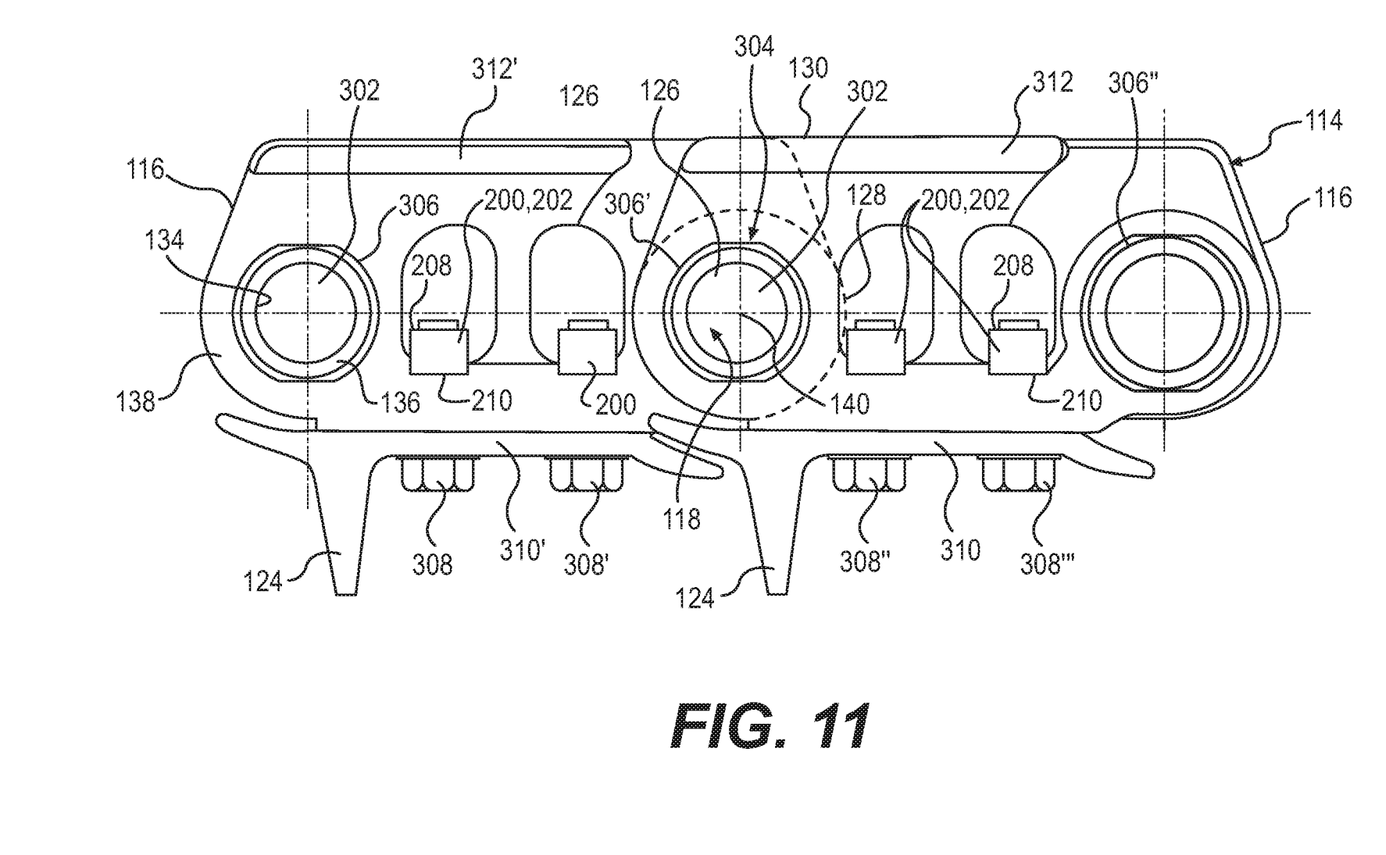
FIG. 11 is an enlarged front view of a pair of track links that are joined together by a track pin and bushing in a manner that is similar to the tracks illustrated in FIGS. 9 and 10. These track links may use a track nut according to any of the embodiments discussed herein to attach shoes to the links using a bolted connection.

Turning now to FIGS. 4, 5 and 11, a track chain 300 comprises a plurality of track pins 302 and track bushings 304 disposed about the track pins 302, and a plurality of track links 312 that are connected to each other by either a track pin 302 or a track bushing 304, wherein at least one track link 312 defines a plurality of apertures 306 for receiving a track pin 302 or bushing 304. The track chain 300 further comprises a plurality of track bolts 308, a plurality of track shoes 310 attached to the track link 312, and a plurality of track nuts 200. The track nut 200 may include a main body 202 defining a central aperture 204 with threads 206 (see FIGS. 1-3) disposed in the central aperture 204, the aperture 204 defining a cylindrical axis A and a radial direction R. The track nut 200 may further include a first end 208 and a second end 210 disposed along the cylindrical axis A. The first end 208 may define an at least partially circular perimeter 212 and the second end 210 may define a generally polygonal perimeter 214 with a plurality of corners 216, the polygonal perimeter 214 including at least one variable blend portion 218.

As best shown in FIGS. 4 and 5, the variable blend portion 218 may be disposed between the corners 216 of the polygonal perimeter 214 and the polygonal perimeter 214 may be a square perimeter 224. As will be discussed later herein with regards to FIGS. 6 and 7, the variable blend portion may be located at the corner of the track nut. Referring again to FIGS. 4 and 5, the plurality of track links 312 define a pocket 314 that is at least partially complimentarily configured to match the body 202 of the track nut 200. The track nut 200 defines a bearing face 222 at its second end 210 and the pocket 314 defines a bearing surface 316 that is at least partially complimentary configured to match the bearing face 222 of the track nut 200 (see FIG. 5). Also, the corner 216 of the track nut may define a radius of curvature 248 and the pocket 314 of the track link 312 may define a corner 318 with a radius of curvature 320. In some embodiments, the radius of curvature of the corner of the track nut is greater than or equal to the radius of curvature of the corner of the pocket, thereby avoiding unwanted interference when the nut is seated into the pocket.

Figure 6:
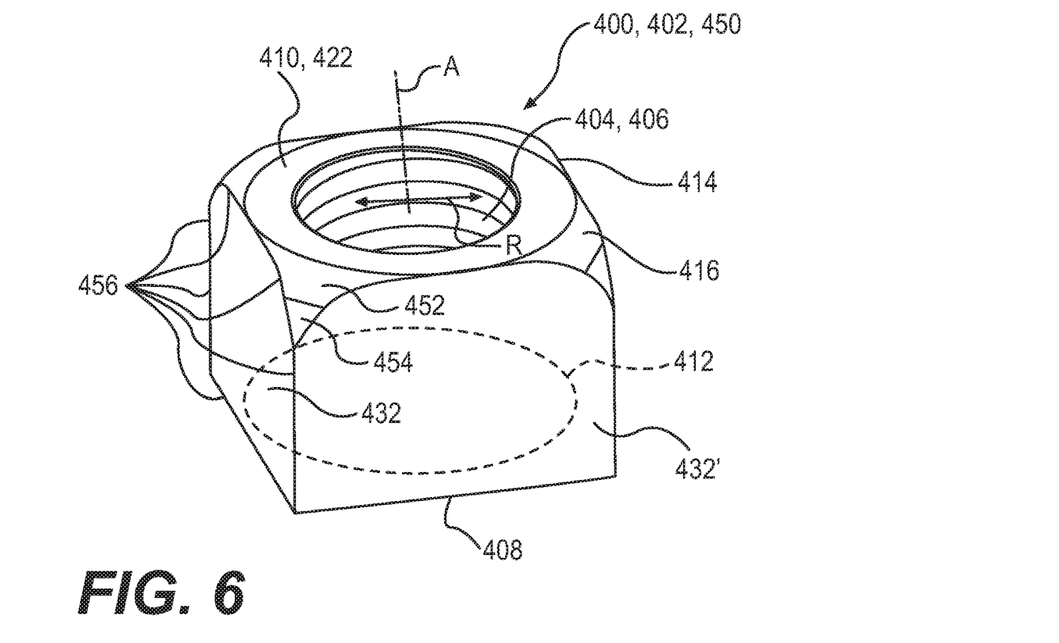
FIG. 6 is a top perspective view of a track nut according to another embodiment of the present disclosure showing the track nut after a first modeling or design step has been completed on the second end of the track nut.
Figure 7:
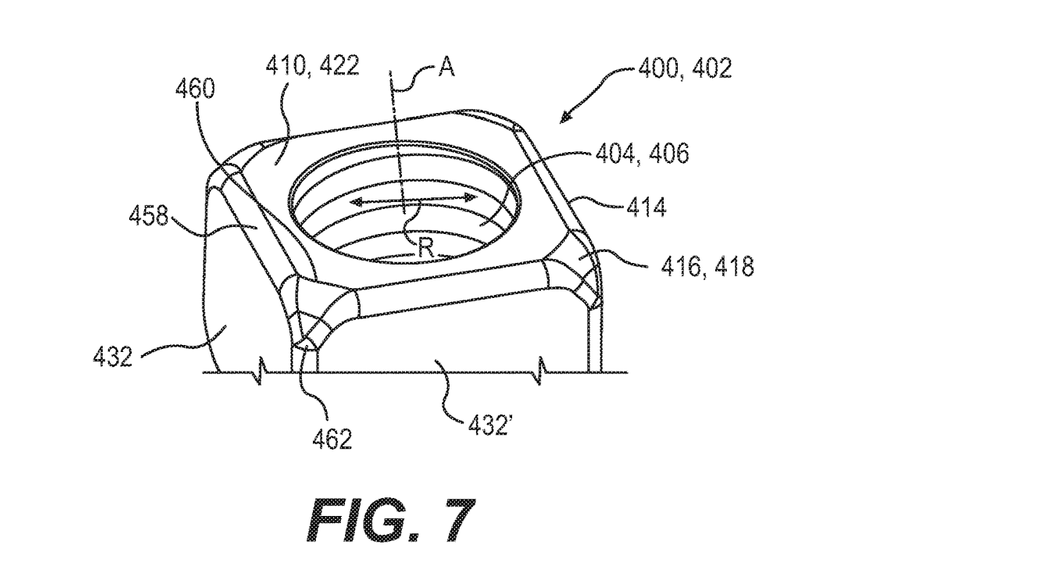
FIG. 7 is another top perspective view of the track nut of FIG. 6 depicting corner regions having a variable blends after a second modeling or design step has been completed.

FIGS. 6 and 7 show another embodiment of a track nut 400 comprising a main body 402 defining a central aperture 404 with threads 406 disposed in the central aperture 404. The aperture 404 may define a cylindrical axis A and a radial direction R. A first end 408 and a second end 410 may be disposed along the cylindrical axis A. The first end 408 may define an at least partially circular perimeter 412 and the second end 410 may define a generally polygonal perimeter 414 with a plurality of corners 416. The polygonal perimeter 414 may include at least one variable blend portion 418. For the embodiment shown in FIGS. 6 and 7, the variable blend portion 418 is disposed at a corner 416.

As illustrated in FIG. 6, the track nut 400 is first formed from a square blank 450 with a central aperture 404 by revolving a radius 452 and chamfer 454 about the cylindrical axis A. Then, the edges 456 are blended by adding a radius 458. This radius 458 may have a value of 2 mm but this may be adjusted as needed or desired. The resulting geometry at the corner 416 formed by the intersection of the two flats 432 with the bearing face 422 goes from a larger radius 460 to a smaller radius 462, creating a variable blend portion 418. This bearing face can then mate with a pocket of a track link such as that depicted in FIG. 11. That is to say, this track nut 400 may be substituted with track nut 200 as shown in FIG. 11. Although not shown in FIG. 6, a chamfer may be added proximate the circular perimeter of the first end of the track nut, similar to what has been previously described regarding the track nut of FIGS. 1-3.

Figure 15:
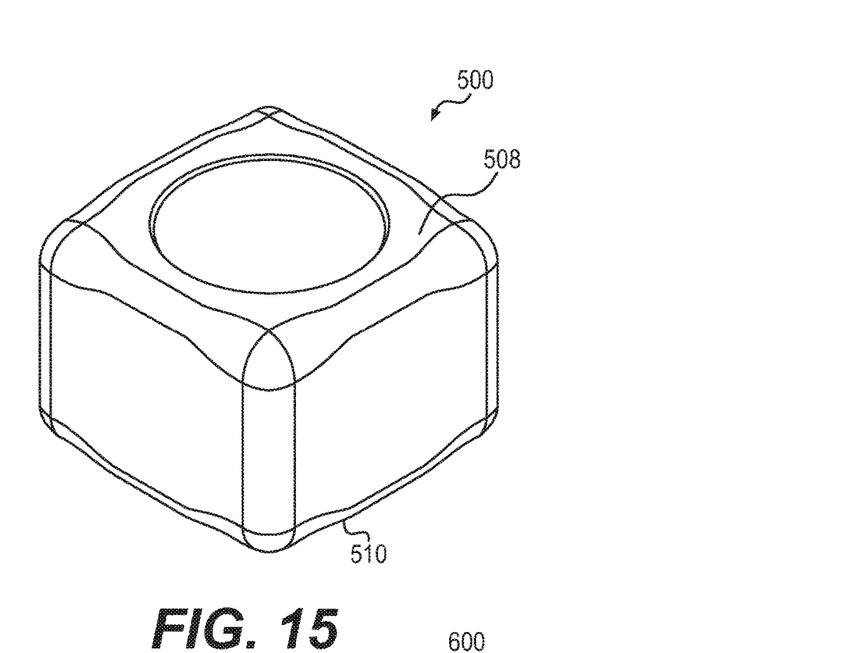
FIG. 15 illustrates another embodiment of a track nut similar to the track nut of FIGS. 1 thru 5, except both ends of the track nut have the same geometry, providing a symmetrical nut.
Figure 16:
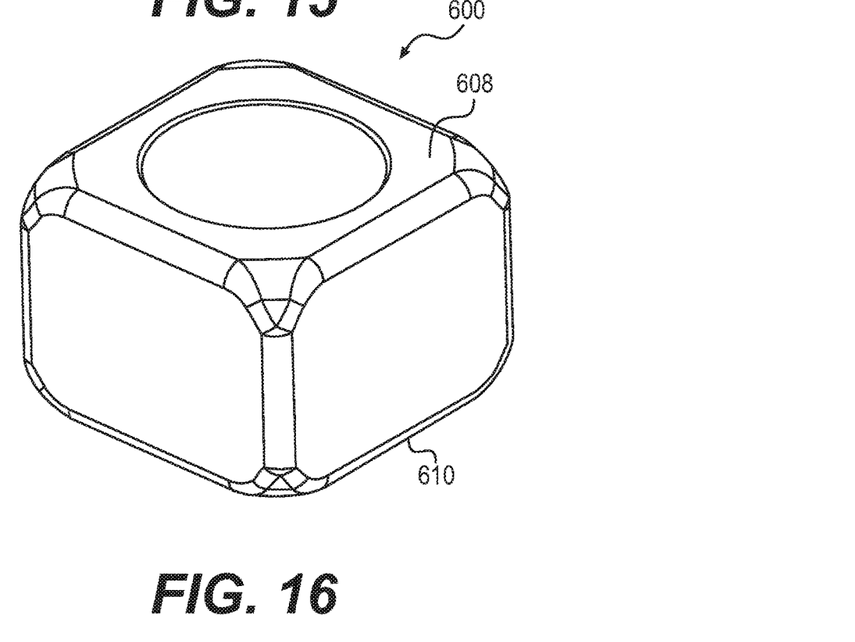
FIG. 16 depicts another embodiment of a track nut similar to the track nut of FIG. 7, except both ends of the track nut have the same geometry, providing a symmetrical nut.

FIGS. 15 and 16 illustrate embodiments of track nuts 500, 600, similarly constructed as those depicted in FIGS. 1-5, and 6-7 respectively, which have the save geometry on both ends 508, 510, 608, 610 of the track nut 600, providing a symmetrical nut 500, 600. This symmetry helps to foolproof the assembly of the nut onto a track link but may be difficult to manufacture without increasing tolerances, etc.

INDUSTRIAL APPLICABILITY

In practice, a track chain assembly, a link and shoe subassembly, and/or track nut may be sold, manufactured, bought etc. and attached to the machine in the aftermarket or original equipment scenarios. That is to say, the machine may be sold with the track chain assembly, link and shoe subassembly, and track nut according to embodiments described herein or the machine may be retrofitted, repaired, refurbished to use any of the embodiments discussed herein. The track nut illustrated in FIGS. 1 thru 3 is particularly well suited to be used with track links already in the field, having been designed to fit properly in the pockets of those track links.

Figure 8:
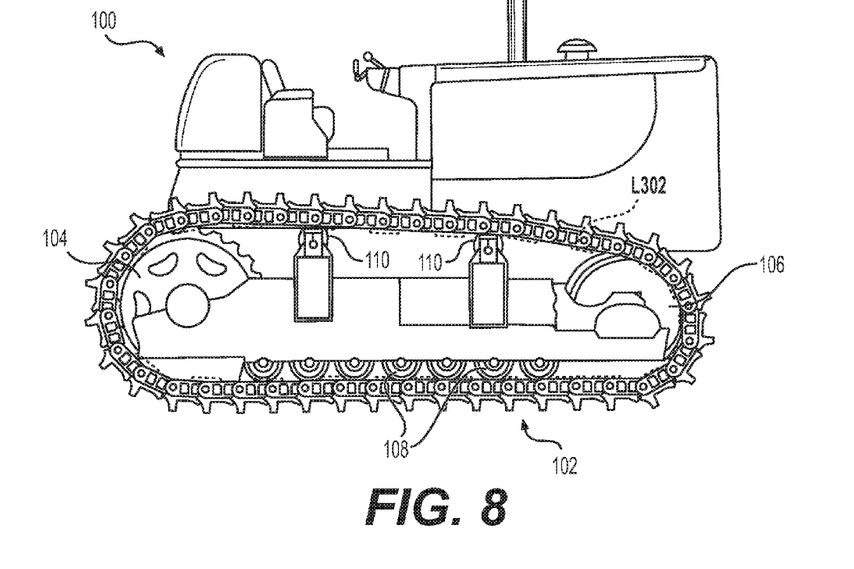
FIG. 8 is a side view of a tractor using an endless track chain that may use an idler wheel in accordance with various embodiments of the present disclosure.

FIG. 8 illustrates a track-type tractor 100 employing a pair of endless track chain assemblies 102 (one shown) of this invention thereon. Although the track assembly is particularly adapted for use on a tractor, it should be understood that the track assembly will find application to other vehicles, such as track-type excavators or any other type of off-road vehicle or machinery. In the tractor application illustrated in FIG. 8, each track chain assembly 102 is mounted in a conventional manner on a drive sprocket 104, an idler 106, a plurality of longitudinally spaced track rollers 108, and a pair of upper guide or carrier rollers 110, when needed.

Figure 9:
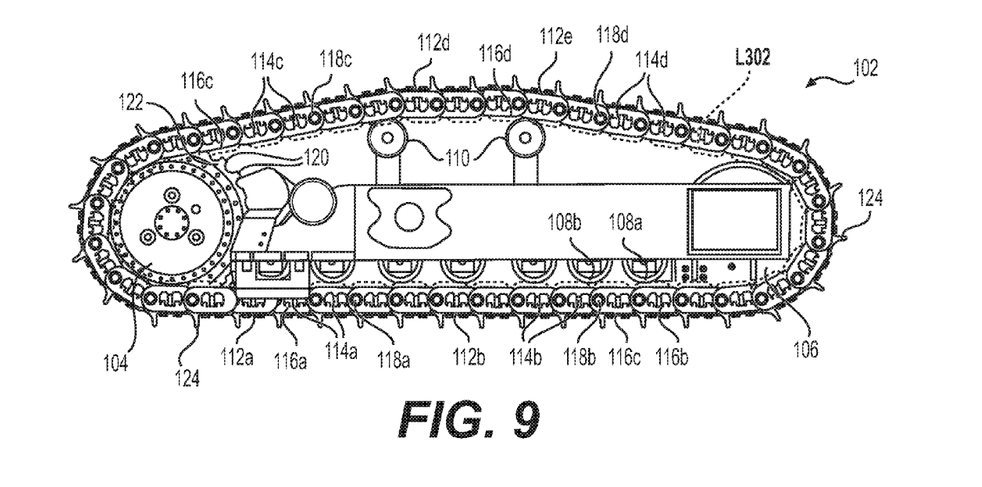
FIG. 9 is a side view of an endless track that is similar to that disclosed in FIG. 8 but is isolated from the tractor, illustrating more clearly an in-line configuration of endless track.
Figure 10:
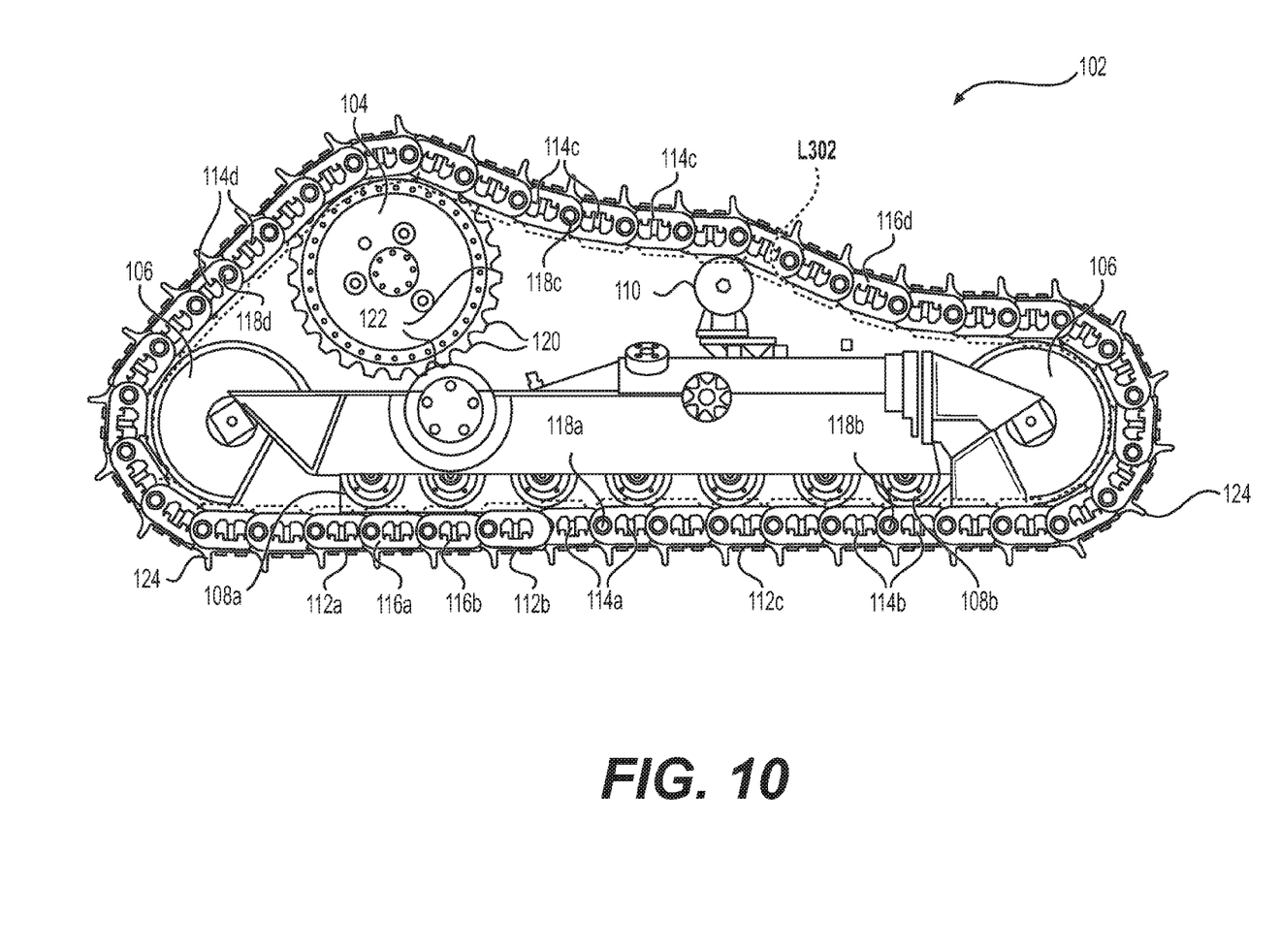
FIG. 10 is a front view of an endless track similar to that shown in FIG. 9 except that is uses an elevated drive sprocket.

Referring to FIGS. 9 and 10, a track assembly 102 comprises a plurality of track shoes 112 which are pivotally interconnected by an articulated link assembly 114. Link assembly 114 is disposed intermediate the widths of track shoes 112 and includes a plurality of pairs of links, pivotally interconnected together by standard pin and bushing assemblies 118. The teeth 120 of drive sprocket 104 engage the bushings of pin and bushing assemblies 118 to drive track assembly 102 in a conventional manner with the track assemblies being guided by idler 106 and rollers 108 and 110 which engage upper rail portions of links. The main difference between the configurations of the track assembly of FIGS. 9 and 10 is that FIG. 9 is an inline configuration, so called as the drive sprocket is in-line with the front idler wheel forming a substantially ovular path for the track, while FIG. 10 shows an elevated configuration, so called as the drive sprocket is vertically above the lower idler wheels forming a substantially triangular path for the track. Track chains with track links and track nuts according to various embodiments of the present disclosure may be used with any apparatus shown in FIGS. 8 thru 10.

With continued reference to FIGS. 9 and 10, the lower rollers are often called track rollers 108 as they support the weight of the vehicle and transfer it to the track and then to the ground while the upper rollers are often called carrier rollers 110 as they only carry or support the track, limiting or sometimes modifying the catenary hang of the track. The drive sprockets 104 have segments 122 with drive teeth 122 connected to them or integrally formed therewith that mesh with the links in the track chain assembly 102, powering movement of the track, and thus the vehicle. The shoes 112 include provide movable platforms that engage the ground and include ribs or grousers 124 that penetrate the ground, providing traction. The idler wheels 106 lack teeth but ride between the links (see G in FIG. 5) and on top of the rails of the links, limiting side to side movement of the track. Similarly, the rollers 108, 110 provide a conduit for the transfer of weight, and in many cases, provide a way to adjust the tension in the track. The rollers 108, 110 also ride between the links 116 and on top of the rails of the links, limiting side to side movement of the track.

Figure 12:
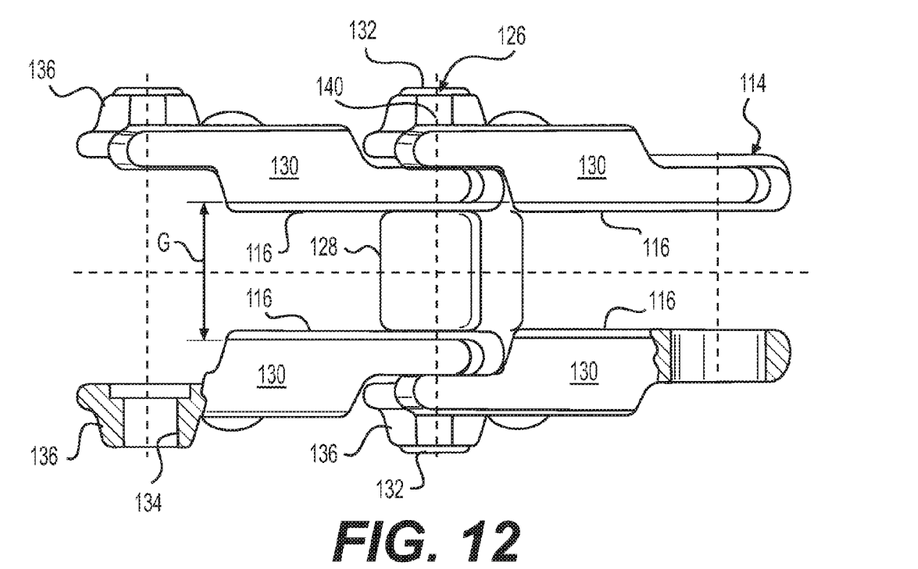
FIG. 12 is a top view of the track links, bushing and track pin of FIG. 11. The track shoes are removed for extra clarity.

Turning now to FIGS. 11 and 12, they show an example of a link assembly 114 that includes a pair of track links that are joined together by a track pin and bushing assembly 118 in a manner consistent with the tracks illustrated in FIGS. 9 and 10. The track pin and bushing assembly 118 form a joint that includes a cylindrical pin 126, and a rotatable tubular bushing 128. The pin 126 has opposite end portions 132 (best seen in FIG. 12), each of which is pressed and non-rotatably mounted into a respective one of the bore 134 formed by a protruding boss 136 of the outboard end collars 138 of each link 116 in a link set 114. The pin and bushing assembly 118 further includes a method and device for mechanically interlocking the pin 126 within such bores 134 to prevent any axial movement of the links 116 along a longitudinal or cylindrical axis 140 of the pin 126.

Other types of methods for mechanically interlocking the pin to the links that are known or that will be devised in the art may be employed. One mechanically interlocking method comprises a circumferentially disposed, generally arcuately shaped groove formed about each of the end portions of the pin and at least one mechanically formed nodule which protrudes radially inwardly from each of the bores into a respective one of the grooves. The mechanically formed nodules are preferably formed by using a punch device. Preferably, a pair of such punch devices are located perpendicular to the pin axis on each of the flats provided on the pin boss. The application of a sufficient force of the punch devices will result in the extrusion of the boss metal into the groove. Other methods for achieving this are also available and may be used.

Figure 13:
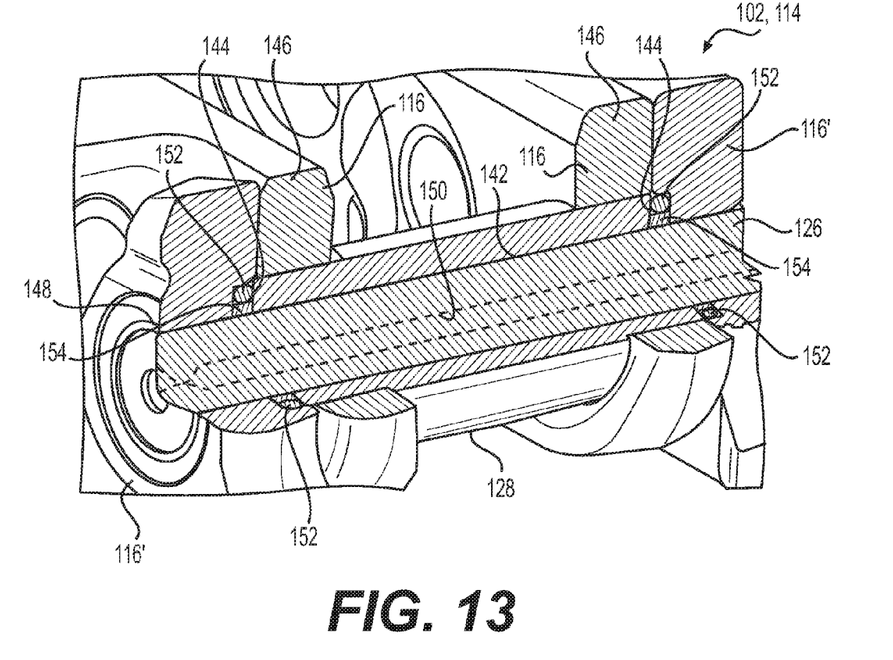
FIG. 13 is a perspective sectional view of track links, a bushing and track pin that is similar to that shown in FIG. 12.

Referring to FIG. 13, there is shown a portion of an undercarriage for a track-type machine that uses a track chain assembly 102 and link assembly 114 that are similar to those described thus far herein. The tubular bushing 128 is provided with a pin bore 142 which is of a size sufficient to freely rotatably mount the bushing 128 about the pin 126. Bushing 128 has a pair of opposite end faces 144 and is of a size to extend between and to freely rotatable relative to the inboard end collars 146.

As shown in FIG. 13, each link assembly includes inboard links and outboard links. Inboard links and outboard links may be coupled together with a plurality of additional inboard and outboard links (not shown), to form an endless chain extending about a conventional drive mechanism including one or more track idlers and a drive sprocket. This may be used in a variety of track-type machines, such as a track-type tractor, tracked excavator, tracked loader, or the like. One practical implementation of the teachings set forth herein is contemplated to be in track-type tractors used in particularly harsh field conditions, such as mines and landfills.

The track pin 126 may be press fit with outboard links. In one embodiment, retention rings 148 or some other mechanism for positive pin retention may be coupled with pin 126 to enhance the strength of the coupling with outboard links 200, 200'. In the embodiment shown, inboard links and outboard links include S-shaped or offset links, however the present disclosure is not limited in this regard and straight link track might also be used. During operation as already discussed, one or more track idlers and a drive sprocket may engage with the bushing 128 to guide and provide power to the track in a conventional manner. As will be familiar to those skilled in the art, some structure for lubricating surfaces which move against one another within the track assembly may be desirable. To this end, the pin 126 may include an oil passage 150 which serves as an oil reservoir for supplying oil to desired locations within track segment.

During track assembly at the factory or during track repair or servicing, lubricating oil may be supplied into passage 150, and the oil passage may be plugged to seal the lubricating oil therein. A set of seals 152 may also be provided, which fluidly seal between outboard links and bushing 128 to retain oil within the link assembly 114. The link assembly 114 also includes a set of thrust rings 154, each positioned between the bushing 128 and one of outboard links 116'. Thrust rings 154 can react to thrust loads through the link assembly 114, and may be configured to prevent compressive forces on seals 152 which can otherwise impart a tendency for seals to fail. Each of thrust rings 154 may be uniquely configured to provide a robust mechanism for reacting thrust loads, but also facilitate the transfer into and maintaining of oil within a region of the link assembly 114 defined between bushing 128 and outboard links, and also between each seal 152 and the pin 126. It should be noted that the oil passage is shown in dotted lines, indicating that in certain embodiments, it may not be present, such as will now be described.

Figure 14:
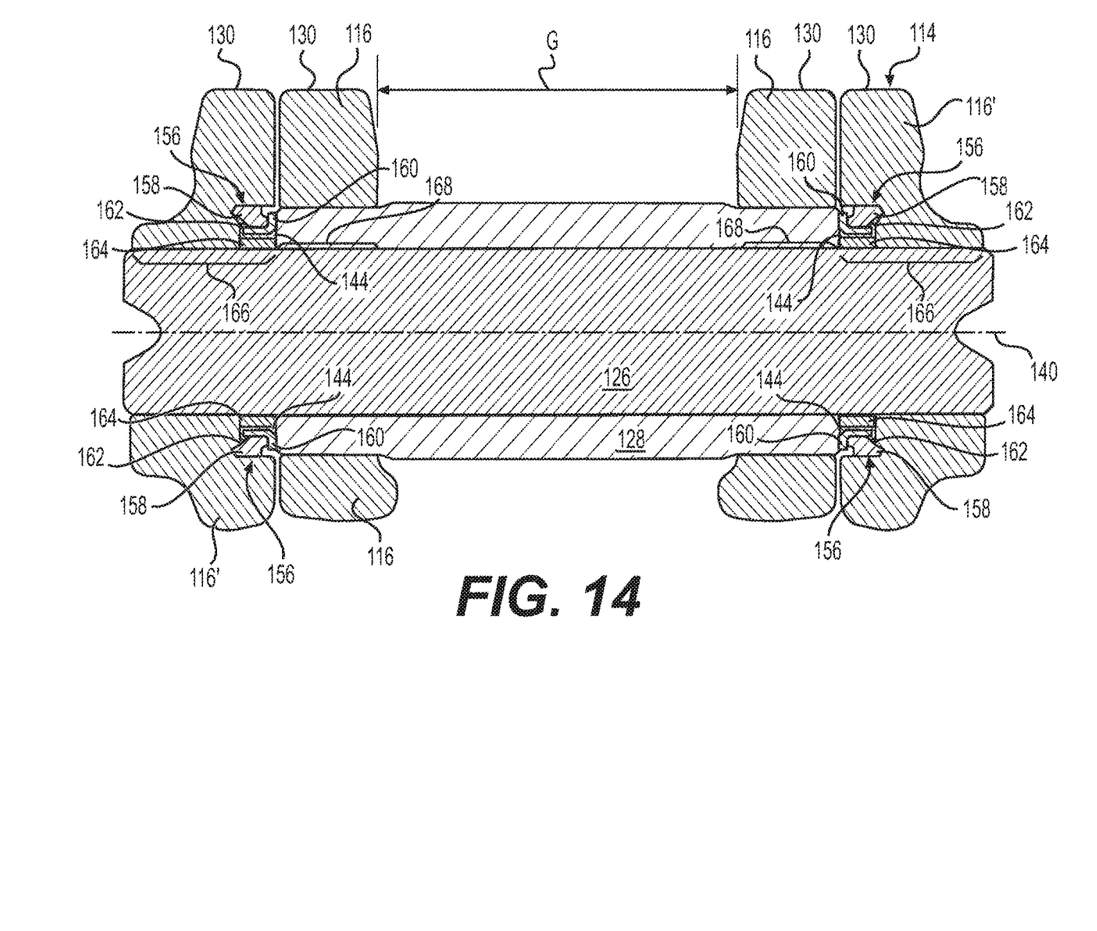
FIG. 14 is a plan sectional view of track links, bushing and track pin similar to that shown in FIG. 13, where the track pin is of solid construction, lacking a central oil groove that runs along its cylindrical axis.

FIG. 14 shows another track link assembly 114 that is known in the art that lacks an oil passage or other void that surrounds the longitudinal axis of the pin. This link assembly 114 includes a seal assembly 156 that includes first and second seal members 158, 160 that provide sealing between the inboard end collars 146 of the outboard link and the bushing 128. Each of the seal assembly 156 is disposed within each of the counterbores 162 between the shoulder 164 of the counterbore and the adjacent outer end face 144 of the bushing 128 and in sealing engagement against the outer end face 144. These type of seals are often referred to as rotating face seals as they allow the bushing to rotate relative to the pin 126 and outboard link while still keeping lubrication from leaking. Also, thrust rings are provided between the pin and seal assembly for reasons already explained above. The pin includes regions that absorb loads from the links either directly or indirectly through the bushing. Specifically, region 166 is in contact with the outboard link 116' while region 168 is in contact with the bushing 128 directly underneath the inboard link.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, it is intended that the specification and examples be considered as exemplary only, with a true scope and spirit of the invention(s) being indicated by the following claims and their equivalents.

What is claimed is:

1. A track nut comprising:
   a main body defining a central aperture with threads disposed in the central aperture, the aperture defining a cylindrical axis and a radial direction;
   a first end and a second end disposed along the cylindrical axis; and
   wherein the second end defines a generally polygonal perimeter with a plurality of corners, the polygonal perimeter including a variable blend portion between each of the plurality of corners that defines a radius of curvature that decreases between each of the plurality of corners.

2. The track nut of claim 1 wherein the polygonal perimeter is a square perimeter that defines four corners and wherein the first end defines an at least partially circular perimeter.

3. The track nut of claim 2 wherein each corner defines a radius extending along a direction parallel to the cylindrical axis.

4. The track nut of claim 1 wherein the variable blend portion includes an exact radius.

5. The track nut of claim 1 wherein the radius of curvature varies from 2 to 5 mm.

6. The track nut of claim 5 wherein the radius of curvature varies from 2.5 to 4 mm.

* * * * *